(No Model.)
P. GARDNER.
FAUCET FOR DRAWING BEER AND OTHER LIQUORS.
No. 298,686. Patented May 13, 1884.
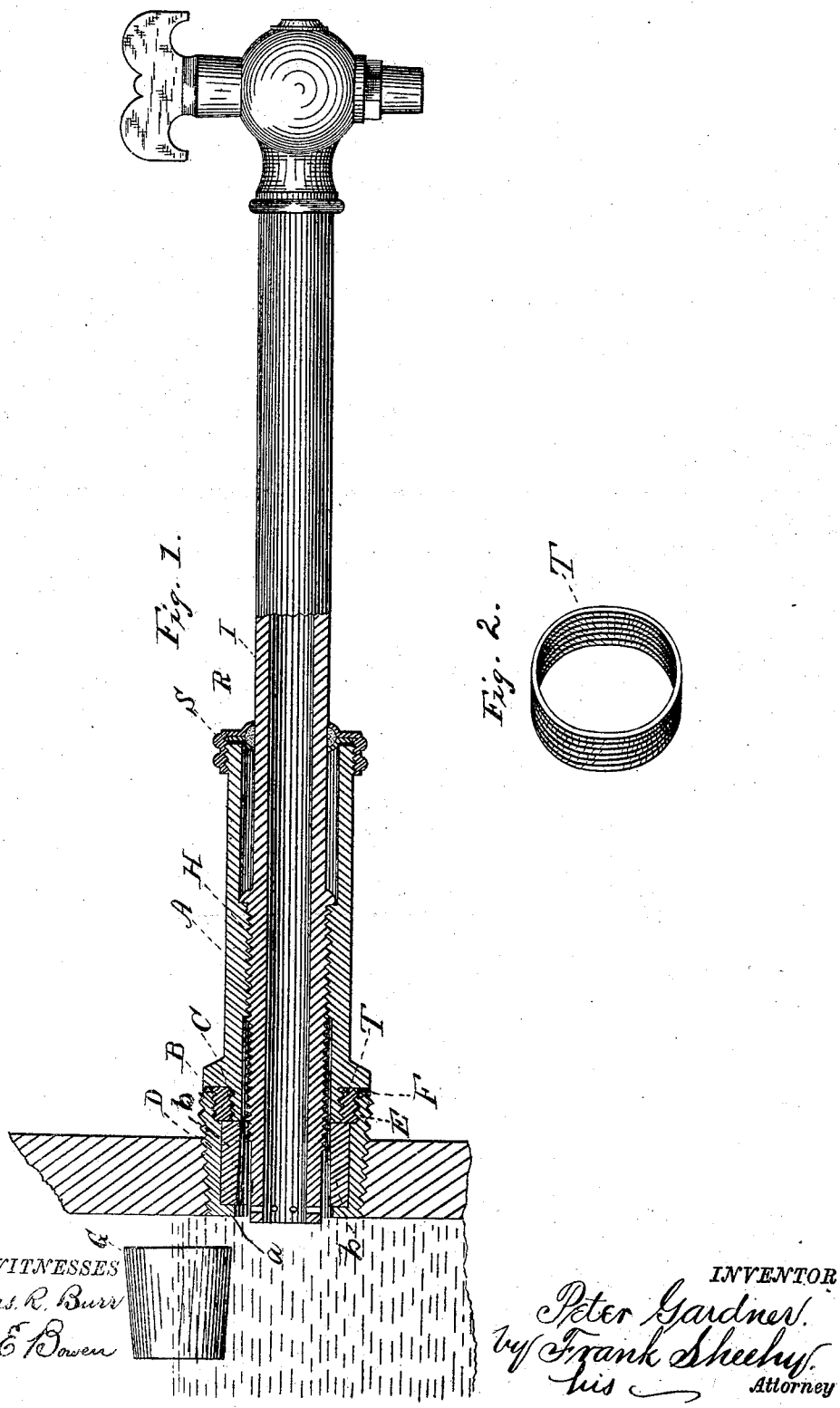

United States Patent Office.

PETER GARDNER, OF SAN RAFAEL, CALIFORNIA.

FAUCET FOR DRAWING BEER AND OTHER LIQUORS.

SPECIFICATION forming part of Letters Patent No. 298,686, dated May 13, 1884.

Application filed October 10, 1883. (No model.)

*To all whom it may concern:*

Be it known that I, PETER GARDNER, a citizen of the United States, residing at San Rafael, in the county of Marin and State of California, have invented certain new and useful Improvements in Faucets for Drawing Beer and other Liquors, of which the following is a specification, reference being had therein to the accompanying drawings.

This invention relates to certain improvements in faucets for beer-kegs and other vessels containing liquids under pressure; and it has for its objects to provide a faucet which may be applied to any vessel or keg, and by means of which the same may be tapped conveniently without waste of material, as more fully hereinafter specified. These objects I attain by the means illustrated in the accompanying drawings, in which—

Figure 1 represents a view partly in longitudinal section and partly in side elevation of my improved faucet, showing the same attached to a beer-keg; and Fig. 2 represents a perspective view of a metallic screw-threaded annulus to be employed in connection with the faucet, in order to adapt it to bushing of different sizes, the interior diameter varying according to the size of faucet used.

The letter A indicates a tube or sleeve provided near its rear end with a shoulder, B, and at its rear extremity with an external screw-thread, C, by means of which it may be secured to the metallic bushing D, which is screw-threaded externally, so as to be inserted and secured in the aperture in the head of the keg or other portion of the keg or vessel. The said plug or bushing (which is tubular) is provided on its inside with an annular recess, E, in which sets the threaded annulus T, with a packing-ring, F, of suitable material, interposed between the outer edge of the said bushing and rear end of the faucet, the internal walls of the plug or bushing and the packing diverging from front to rear, so as to receive the stopper G, which is inserted from the rear, and permit it to be forced back when securing the faucet and tapping the keg, as more fully hereinafter explained. This bushing D is also provided at its inner end with an internal annular flange, *a*, to retain the lining or packing-ring *b*, which tapers on its inner longitudinal walls from front to rear, to receive the plug G. The tube or sleeve A on its interior is formed with a screw-threaded annulus, H, through which works the externally-screw-threaded portion of a tube, I, through which the contents of the keg or vessel are drawn off. The forward portion of said tube is plain—that is, devoid of screw-threads—and passes through a gland, R, secured to the end of the tube or sleeve A by means of a screw-threaded annular cap, S, which is secured to the forward screw-threaded end of the said tube or sleeve A.

The letter T indicates a metallic screw-threaded annulus adapted to be secured within the forward end of the bushing D, which is internally screw-threaded for the purpose. This annulus T serves to adapt the bushing D for the reception of different-sized faucets, being of various sizes internally to reduce or increase the seat for the faucets. Between the bushing and the shoulder on the tube or sleeve A is interposed a packing, F, to prevent leakage.

By the construction described it will be observed that the faucet may be adjusted to various positions without changing the position of the vessel to which it is connected.

Having thus described my invention, what I claim, and desire to secure by Letters Patent, is—

1. In combination with the outer tube or sleeve, A, constructed as described, the bushing D, adapted to be secured in a keg or vessel, the internal tube, I, screw-threaded externally, and the screw-threaded annulus adapted to be secured in the internally-threaded bushing D, substantially as and for the purposes specified.

2. In a faucet, the combination, with the bushing D, having its exterior threaded and provided with the inner annular flange, *a*, and the internally-threaded offset at its forward end, and the tube I, substantially as shown, of the sleeve A, having the internal threads, H, the externally-threaded forward extension to engage the threaded annulus T in the bushing D, and the lining *b*, all adapted to operate substantially as and for the purposes specified.

3. In a faucet, the combination, with a vessel having an externally-threaded bushing, of the sleeve A, having its forward and rear ends respectively provided with external threads, the draft-tube I, the gland R, and internally-threaded cap S, with suitably-interposed packing between the gland-cap and tube to form a fluid-tight joint between the sleeve and the draft-tube, substantially as specified.

In testimony whereof I affix my signature in presence of two witnesses.

PETER GARDNER.

Witnesses:
E. L. WHITE,
J. J. SHEEHY.